United States Patent [19]

Hawkins et al.

[11] Patent Number: 6,000,000

[45] Date of Patent: *Dec. 7, 1999

[54] EXTENDIBLE METHOD AND APPARATUS FOR SYNCHRONIZING MULTIPLE FILES ON TWO DIFFERENT COMPUTER SYSTEMS

[75] Inventors: Jeffrey C. Hawkins, Redwood City; Michael Albanese, Los Gatos, both of Calif.

[73] Assignee: 3Com Corporation, Santa Clara, Calif.

[ * ] Notice: This patent is subject to a terminal disclaimer.

[21] Appl. No.: 09/072,274

[22] Filed: May 4, 1998

Related U.S. Application Data

[63] Continuation of application No. 08/542,055, Oct. 13, 1995, Pat. No. 5,884,323.

[51] Int. Cl.$^6$ .................................................. G06F 17/30
[52] U.S. Cl. ............................................... 707/201
[58] Field of Search ............................................... 707/201

[56] References Cited

U.S. PATENT DOCUMENTS

| | | | |
|---|---|---|---|
| 4,432,057 | 2/1984 | Daniell et al. | |
| 4,807,182 | 2/1989 | Queen | |
| 4,866,611 | 9/1989 | Cree et al. | |
| 4,875,159 | 10/1989 | Cary et al. | |
| 4,956,809 | 9/1990 | George et al. | |
| 5,001,628 | 3/1991 | Johnson et al. | |
| 5,065,360 | 11/1991 | Kelly | 395/800 |
| 5,124,909 | 6/1992 | Blakely et al. | 395/200 |
| 5,142,619 | 8/1992 | Webster, III | 395/157 |
| 5,159,592 | 10/1992 | Perkins | 370/85.7 |
| 5,187,787 | 2/1993 | Skeen et al. | 395/600 |
| 5,210,868 | 5/1993 | Shimada et al. | 395/600 |
| 5,237,678 | 8/1993 | Kuechler et al. | 395/600 |
| 5,251,291 | 10/1993 | Malcom | 395/146 |
| 5,261,045 | 11/1993 | Scully et al. | 395/161 |
| 5,261,094 | 11/1993 | Everson et al. | 395/600 |

(List continued on next page.)

OTHER PUBLICATIONS

*PC–LINK Release 2 for the Casio BOSS,* Traveling Software, Nov. 1989.

*Connectivity Pack for the HP 95 LX,* Hewlett Packard, Apr. 1991.

*Sharp Organizer Link II, Operation Manual,* Sharp Electronics, undated.

Zahn et al., Network Computing Architecture, pp. 1–11, 19–31, 87–115,117–133, 187–199, 201–209 (1990).

IntelliLink Brochure (1990).

"Logical Connectivity: Applications, Requirements, Architecture, and Research Agenda, "Stuart Madnick & Y. Richard Wang, MIT, System Sciences, 1991, Hawaii Int'l, vol. 1, IEEE, Jun. 1991.

"FRx extends reporting power of Platinum Series: (IBM Desktop Software's line of accounting software)", Doug Payton, PC Week, V. 8, No. 5, p. 29(2), Feb. 1991.

Cobb et al., "Paradox 3.5 Handbook 3rd Edition", Bantam (1991), pp. 803–816.

(List continued on next page.)

*Primary Examiner*—Richard L. Ellis
*Attorney, Agent, or Firm*—Blakely, Sokoloff, Taylor & Zafman LLP

[57] ABSTRACT

Many users of handheld computer systems maintain databases on the handheld computer systems. To share the information, it is desirable to have a simple method of sharing the information with personal computer systems. An easy to use extendible file synchronization system is introduced for sharing information between a handheld computer system and a personal computer system. The synchronization system is activated by a single button press. The synchronization system proceeds to synchronize data for several different applications that run on the handheld computer system and the personal computer system. If the user gets a new application for the handheld computer system and the personal computer system, then a new library of code is added for synchronizing the databases associate with the new application. The synchronization system automatically recognizes the new library of code and uses it during the next synchronization.

27 Claims, 7 Drawing Sheets

U.S. PATENT DOCUMENTS

| | | | |
|---|---|---|---|
| 5,272,628 | 12/1993 | Koss | 364/419.19 |
| 5,283,887 | 2/1994 | Zachery | 395/500 |
| 5,301,313 | 4/1994 | Terada et al. | 395/600 |
| 5,315,709 | 5/1994 | Alston, Jr. et al. | 395/600 |
| 5,327,555 | 7/1994 | Anderson | 395/600 |
| 5,333,252 | 7/1994 | Brewer, III et al. | 395/148 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,379,057 | 1/1995 | Clough et al. | 345/173 |
| 5,392,390 | 2/1995 | Crozier | 345/335 |
| 5,434,994 | 7/1995 | Shaheen et al. | 395/500 |
| 5,463,772 | 10/1995 | Thompson et al. | 395/600 |
| 5,475,833 | 12/1995 | Dauerer et al. | 395/600 |
| 5,519,606 | 5/1996 | Frid-Nielsen et al. | 364/401 |
| 5,537,592 | 7/1996 | King et al. | 395/600 |
| 5,544,356 | 8/1996 | Robinson et al. | 395/600 |
| 5,546,539 | 8/1996 | Poling | 395/200.05 |
| 5,566,069 | 10/1996 | Clark, Jr. et al. | 364/420 |
| 5,572,528 | 11/1996 | Shuen | 370/85.13 |
| 5,574,859 | 11/1996 | Yeh | 395/200.01 |
| 5,592,669 | 1/1997 | Robinson et al. | 395/622 |
| 5,598,536 | 1/1997 | Slaughter, III et al. | 395/200.16 |
| 5,649,195 | 7/1997 | Scott et al. | 395/617 |
| 5,666,362 | 9/1997 | Chen et al. | 370/420 |
| 5,666,530 | 9/1997 | Clark et al. | 395/617 |
| 5,666,553 | 9/1997 | Crozier | 395/803 |
| 5,684,990 | 11/1997 | Boothby | 395/619 |
| 5,696,702 | 12/1997 | Skinner et al. | 702/186 |
| 5,701,423 | 12/1997 | Crozier | 395/335 |
| 5,706,509 | 1/1998 | Man-Hak Tso | 395/617 |
| 5,710,922 | 1/1998 | Alley et al. | 395/617 |
| 5,727,159 | 3/1998 | Kikinis | 395/200 |
| 5,727,202 | 3/1998 | Kucala | 395/610 |
| 5,729,452 | 3/1998 | Smith et al. | 701/29 |
| 5,742,820 | 4/1998 | Perlman et al. | 395/617 |
| 5,761,439 | 6/1998 | Kar et al. | 395/200.78 |
| 5,845,282 | 12/1998 | Alley et al. | 707/10 |
| 5,857,201 | 1/1999 | Wright, Jr. et al. | 707/104 |
| 5,864,604 | 1/1999 | Moen et al. | 379/88 |
| 5,867,821 | 2/1999 | Ballantyne et al. | 705/2 |

OTHER PUBLICATIONS

Alfieri, "The Best Book of:WordPerfect Version 5.0", Hayden Books (1988), pp. 153–165 and 429–435 1988.

User Manual for PC–Link for the B.O.S.S. and the PC–Link for the B.O.S.S., Traveling Solftware, Inc. (1989).

User Manual for Connectivity Pack for the HP 95LX, Hewlett Packard Company (1991).

Organizer LinkII Operation Manual, Sharp Electronics Corporation, No Date.

"Open Network Computing–Technical Overview", Sun Technical Report, Sun Microsystems, Inc., pp. 1–32 (1987).

Excerpt from Microsoft Windows 95 Documentation, (3) Pages 1995.

Excerpt from LapLink World Wide Web for SpeedSync, (1) Page total. Date Unknown.

EXTENDIBLE METHOD AND APPARATUS FOR SYNCHRONIZING MULTIPLE FILES ON TWO DIFFERENT COMPUTER SYSTEMS

This patent application is a continuation of the U.S. patent application having Ser. No. 08/542,055 that was filed on Oct. 13, 1995 that is now U.S. Pat. No. 5,884,323.

FIELD OF THE INVENTION

The present invention relates to the field of handheld computer devices. Specifically, the present invention discloses a method and apparatus for transferring and synchronizing multiple files between a handheld computer and a personal computer.

BACKGROUND OF THE INVENTION

People have come to rely more and more upon computer devices to organize their lives. For example, people use computers to maintain to-do lists, address lists, and calendars. Many people store this information on desktop personal computers. However, when the person is away from their personal computer this valuable information is not available since it is stored in the desktop personal computer system. To accommodate this situation, a new class of portable handheld computer systems has emerged.

Many handheld computer systems operate as stand alone units wherein the user enters all the information into the handheld unit and the information is retrieved out of the handheld unit alone. Other handheld computer systems operate in conjunction with personal computer systems such that the two systems can transfer data back and forth.

Figure 1:
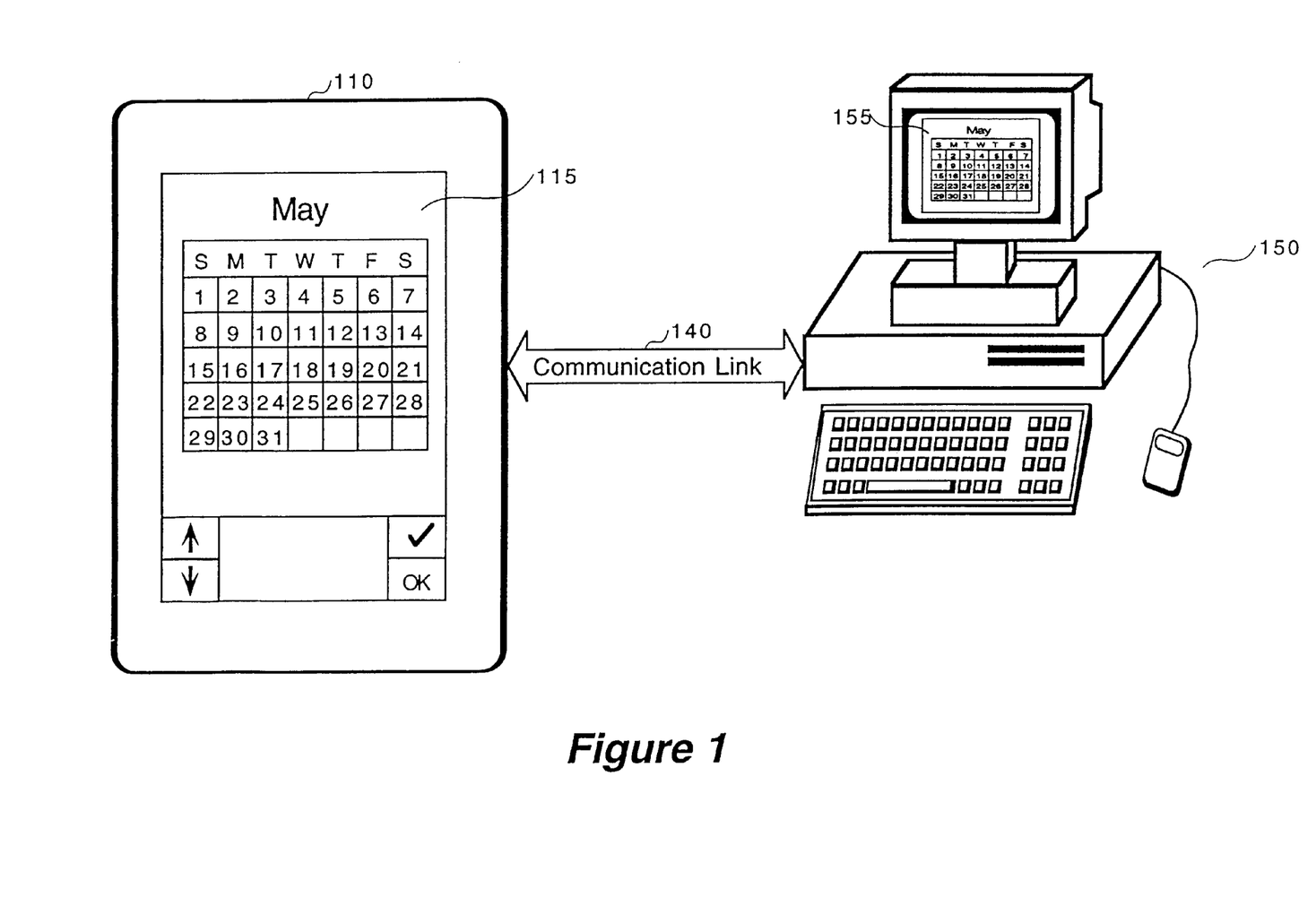
FIG. 1 illustrates a handheld computer system and a personal computer system that share information over a communications link.

FIG. 1 illustrates a handheld computer system and a personal computer system that act together. The handheld computer system 110 is connected to the personal computer system 150 through some type of communication link 140. The communication link 140 often consists of a direct serial data line but may consist of any type of link that will allow the two systems to transfer information back and forth. In the example of FIG. 1, the handheld computer system 110 is running a calendar application program 115 and the personal computer system 150 is running a complimentary calendar program 155. In an ideal arrangement, a user should be able to enter information into either the handheld computer system 110 or the personal computer system 150 and the information will be shared by the two calendar applications.

Figure 2:
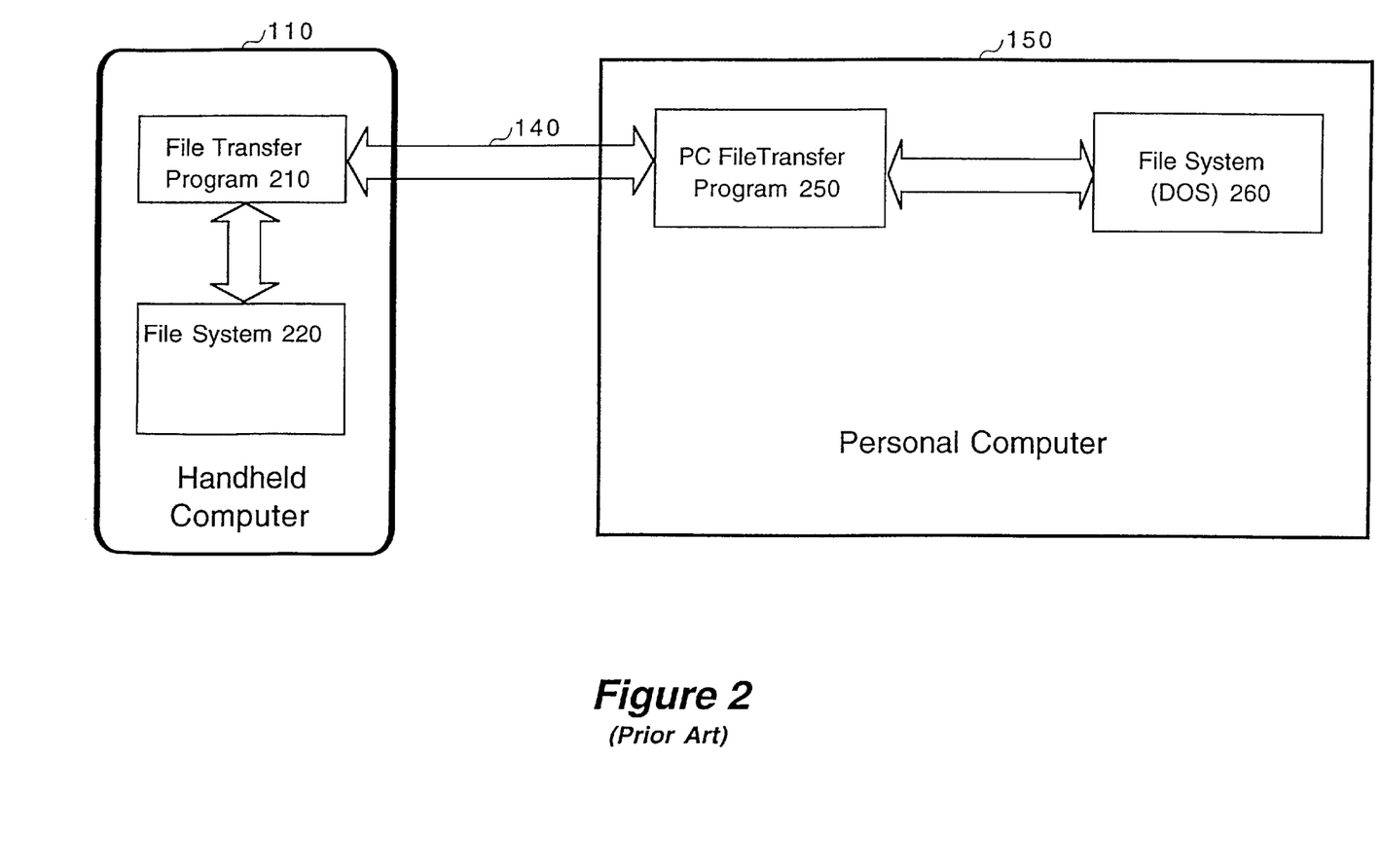
FIG. 2 illustrates a block diagram of a file transfer program on a handheld computer system communicating with a file transfer program on a personal computer system.

FIG. 2 illustrates a first method of transferring information between a handheld computer system 110 and a personal computer system 150 that is employed by some existing handheld computer systems. The method of FIG. 2 consists of a simple file transfer system. In the handheld computer system 110 in FIG. 2 a first file transfer program 210 is located on the handheld computer system to manage file transfers from the handheld computer system. The file transfer program 210 on the handheld computer system communicates with a local file system 220 that is responsible for creating and storing files. The file transfer program 210 on the handheld computer system communicates across the communication link 140 to a PC file transfer program 250 that runs on the personal computer system 150. The PC file transfer program 250 communicates with a PC file system (such as Microsoft DOS) on the personal computer system 150. To invoke the file transfer system of FIG. 2, a user must execute the file transfer program 210 on the handheld computer 110 and the PC file transfer program 250 on the personal computer system 150.

The file transfer system 210 illustrated in FIG. 2 operates only on individual files in the two computer systems such that no individual record analysis is done. For example, the PC file transfer programs on both computers can compare the dates of files on each system and transfer the more recent version from one system over to the other. However, if the files have been modified on both side then the simple file transfer program can not reconcile these changed files.

Figure 3:
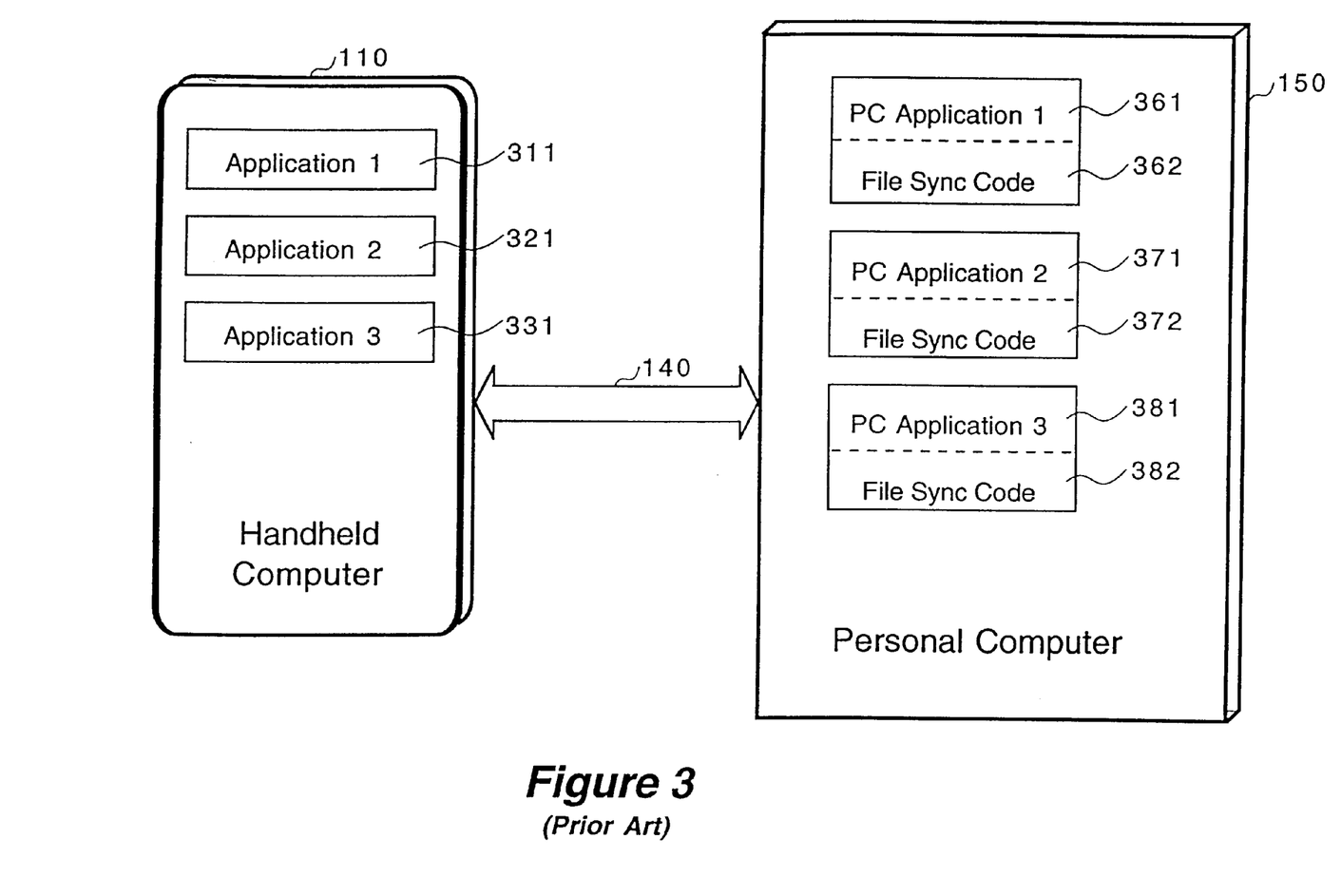
FIG. 3 illustrates a block diagram of several applications on a handheld computer system communicating with several matching applications on a personal computer system.

FIG. 3 illustrates a more sophisticated method of synchronizing files on a handheld computer system and a personal computer system that can reconcile changes within a file. In the transfer system illustrated in FIG. 3 there are several matching application programs in the personal computer system 150 and the handheld computer system 110. For example, there is Application 1 (311) which corresponds to PC Application 1 (361) on the personal computer system 150. Similarly, there is Application 2 (321) and Application 3 (331) on the handheld computer system that match up with PC Application 2 (371) and PC Application 3 (381) on the personal computer system 150 correspondingly.

Since there is a matching application on both the handheld computer system and the personal computer system in the method of FIG. 3, the two matching applications can share information on a record level. For example, an address book containing names, phone numbers, and addresses of people in records can be merged at a record level. Thus, if the handheld computer system 110 is taken on a road trip and the user adds a few new records to the address book program, when the handheld computer system 110 and the personal computer system 150 are later synchronized the address book application on the handheld computer system and the address book application on the personal computer system can transfer the added records from the handheld computer system to the personal computer system. Similarly, if while the main user was on the road and a secretary adds records to the personal computer address book application on the personal computer, 150 those new records can be transferred from the personal computer system 150 to the handheld computer system 110.

However, to accomplish this sophisticated synchronization system, the application on the handheld computer system and the application on the personal computer system must communicate with each other directly. If a user has several applications running on the handheld computer system 110 and the personal computer system 150 that need to be synchronized, then the person must run each pair of matched applications one-at-at-time to perform the synchronization for the different applications. Running each matched pair of applications separately and requesting a file synchronization can be a laborious process and thus limits the user's ability to quickly and easily synchronize the two computer systems.

SUMMARY AND OBJECTS OF THE INVENTION

It is therefore an object of the present invention synchronize the data between several different independent applications which run on the handheld computer system and the personal computer system using a single synchronization command.

This and other objects are accomplished in the synchronization system of the present invention. The synchronization system reconciles multiple files on a personal computer system and a handheld computer system. The synchronization system consists of three main program elements running on the personal computer system: a memory resident monitor program, a sync manager library, and at least one conduit library. The first element is a memory resident monitor program, known as hotsync, that monitors a communications port to determine if the synchronization process has been activated by a palmtop computer system. The second element is a sync manager library. When the memory resident program notices that the palmtop computer system is initiating a synchronization, then the memory resident program begins the synchronization process.

The hotsync memory resident program first consults a sync registry that contains a list of conduit libraries that are used to synchronize different applications on the personal computer system and the palmtop computer system. After obtaining the list of conduit libraries that are available, the sync manager then invokes each conduit library one by one. Each conduit library performs a synchronization for one particular application. The conduit libraries call a set of synchronization functions provided within the sync manager library. After the hotsync memory resident program has executed all the conduit libraries, the hotsync memory resident program informs the user that the synchronization process has completed.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

A method and apparatus for synchronizing multiple databases on a handheld computer system and a personal computer system is disclosed. In the following description, for purposes of explanation, specific nomenclature is set forth to provide a thorough understanding of the present invention. However, it will be apparent to one skilled in the art that these specific details are not required in order to practice the present invention. For example, the present invention will be described with reference to the Microsoft® Windows operating system. However the teachings of the present invention can be used with other personal computer operating systems.

FIG. 1 illustrates a handheld computer system 110 and a personal computer system 150. The handheld computer system 110 may be any type of small microprocessor based computer system such as a cellular phone or a personal information manager. In FIG. 1 both the handheld computer system 110 and the personal computer system 150 are running calendar programs. Ideally a user should be able to alter the data on both the calendar program 115 on the handheld computer system 110 or the data on the personal computer system calendar program 155 on the personal computer system 150. Then, at some later point, the user should be able to reconcile the two calendar databases by coupling the two computer system together using communication link 140. The synchronization system of the present invention implements a simple method of reconciling the two calendar databases. Furthermore, the synchronization system of the present invention is extendible such that it can also reconcile several other databases under control of a single synchronization system that can be started with a single key press.

Figure 4:
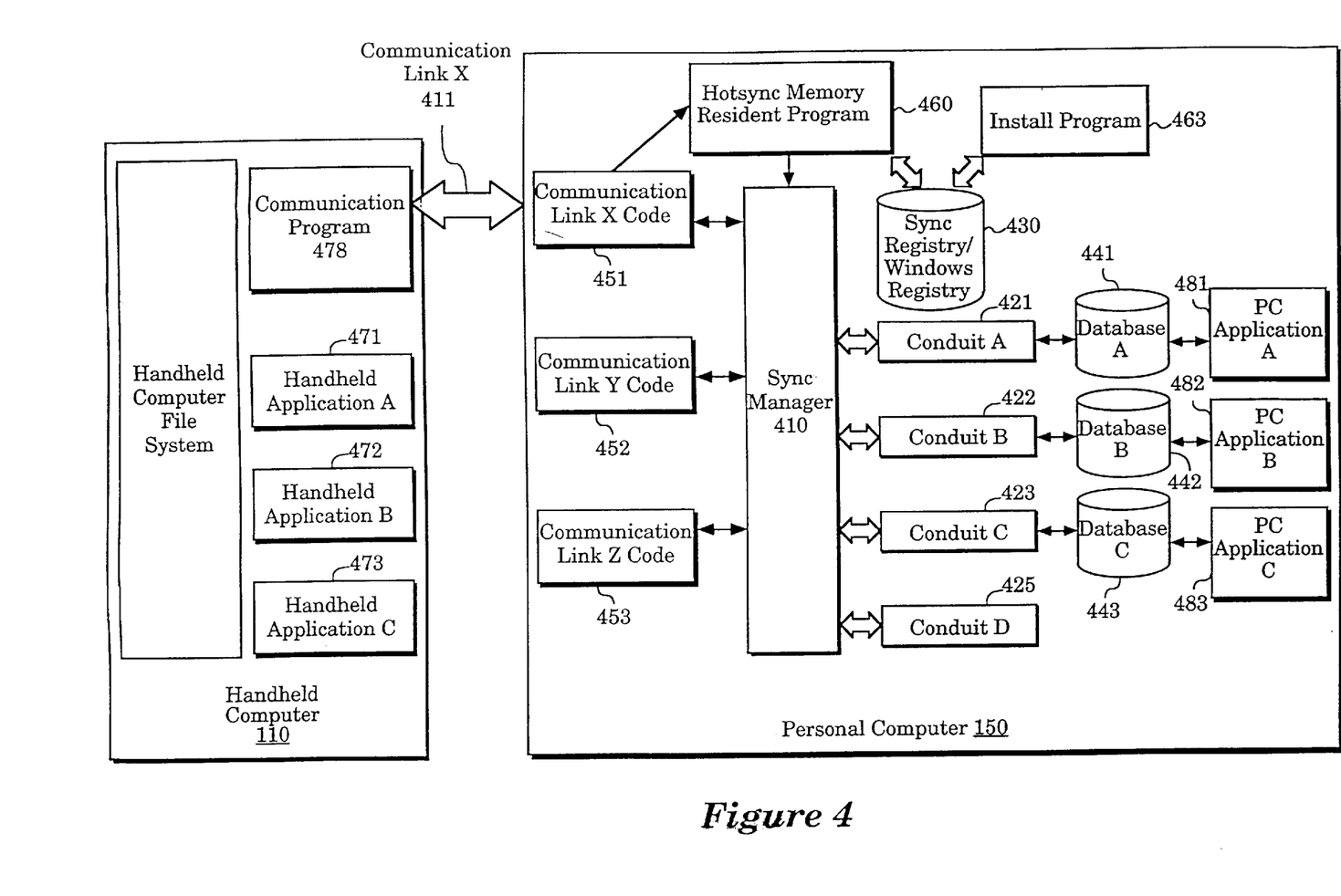
FIG. 4 illustrates a block diagram of the architecture of the synchronization system of the present invention.

FIG. 4 illustrates a block diagram of an architecture for synchronizing databases on a handheld computer system and a personal computer system. The synchronization architecture illustrated in FIG. 4 accommodates several different application programs with associated databases running on the personal computer 150 and the handheld computer system 110.

As illustrated in FIG. 4 handheld computer system 110 has handheld Application A 471, handheld Application B 472, and handheld Application C 473. Each handheld computer application has an associated database (not shown) stored in the file system 477 of the handheld computer system 110. The handheld computer system 110 also has a communication program 478 that handles external communication for the handheld computer system 110.

The personal computer 150 of FIG. 4 has PC Application A 481, PC Application B 482, and PC Application C 483 that correspond to the applications on the handheld computer system 110. Each PC application (481, 482, and 483) also has its own associated database 441, 442, and 443 respectively. The object of the present invention is to be able to synchronize handheld computer system 110 and personal computer 150 such that databases for handheld applications A, B, C (471, 472, and 473) are reconciled with the databases (441, 442, and 443) for PC Application A, B, C (481, 482, and 483).

The synchronization software architecture of the present invention comprises three different pieces of computer code on the personal computer system: the hotsync program 460, sync manager library 410, and conduit libraries (421, 422, and 423). Each type of computer code will be described individually and an example is given that describes how the sections of code work together.

Communication Link Monitor Program

The first piece of code is the hotsync program 460. The hotsync program 460 is a memory resident program that monitors a communication link to see if the handheld computer system 110 has initiated a synchronization. For portability and expandability, it is best to have the hotsync program 460 monitor the communication link using a dedicated piece of code that handles the particular type communication link being used. FIG. 4 illustrates three different instances of dedicated communication link code: communication link X code 451, communication link Y code 452, and communication link Z code 453. Each instance of communication link code may implement a set of routines for handling a particular type of communication link. For example, if communication link X 411 in FIG. 4 is a serial line then communication link X code 451 would drive the serial line. The hotsync program 460 monitors the communication link X 411 using the communication link X code 451 to see if the handheld computer system 110 sent a "wake up" packet that signals a synchronization request. When a "wake up" packet is received, the hotsync memory resident program 460 then begins the full synchronization process. The hotsync memory resident program 460 controls the entire synchronization process, but it uses other libraries of code to perform much of the synchronization.

The Sync Manager Library

The sync manager library 410 contains a set of routines for communicating with handheld computer system 110. In the preferred embodiment of the present invention, the sync manager library is implemented as dynamic link library (library) in the Windows® operating system. However, the functions of the sync manager library 410 can be implemented in other types of function libraries in other types of operating systems. Furthermore, the hotsync program 460 and the sync manager library 410 can be combined into a single program. In the preferred embodiment, the two programs are separated since this arrangement most efficiently uses the resources of the operating system.

The sync manager library 410 implements a library of functions that are made available to other programs for synchronizing databases. To communicate with the handheld computer 110 the sync manager library 410 also uses the communication link code such as communication link X code 451 that controls communication link X 411. The sync manager library 410 does not actually reconcile the individual databases on the personal computer 150 and the handheld computer system 110, instead the sync manager library 410 oversees the synchronization process and uses individual "Conduit" libraries to perform the synchronization of each database.

The Conduit Libraries

The conduit libraries comprise the final type of computer code used in the synchronization process of the present invention. There is a conduit library for each type of database or program that needs to be synchronized on the personal computer 150 and the handheld computer system 110. However, not every conduit program will have associated databases to reconcile as will be explained later.

FIG. 4 illustrates three handheld and PC applications A, B, and C. For each application A, B, and C, there is a an associated conduit library A 421, conduit library B 422, and conduit library C 423. Conduit library D 425 is a conduit library without an associated database or application. It is the sync manager's responsibility to successively invoke each conduit library. To keep track of all the conduit libraries that must be invoked, the sync manager accesses a sync registry 430. The sync registry 430 is a database that contains a list of all the conduit libraries that the sync manager must invoke to perform a full synchronization of the personal computer 150 and the handheld computer system 110. In a preferred embodiment, the sync registry 430 is implemented as a registry in the Windows® operating system.

The sync registry 430 must be modified any time a new conduit library is installed into the system or an existing conduit library is removed from the system. For example, when a new conduit library is installed, the installer program 463 adds an entry for the new conduit library into sync registry 430. Similarly, when an existing conduit library is removed from the system, that conduit library should also be removed from the sync registry 430.

The Synchronization Process

Figure 5:
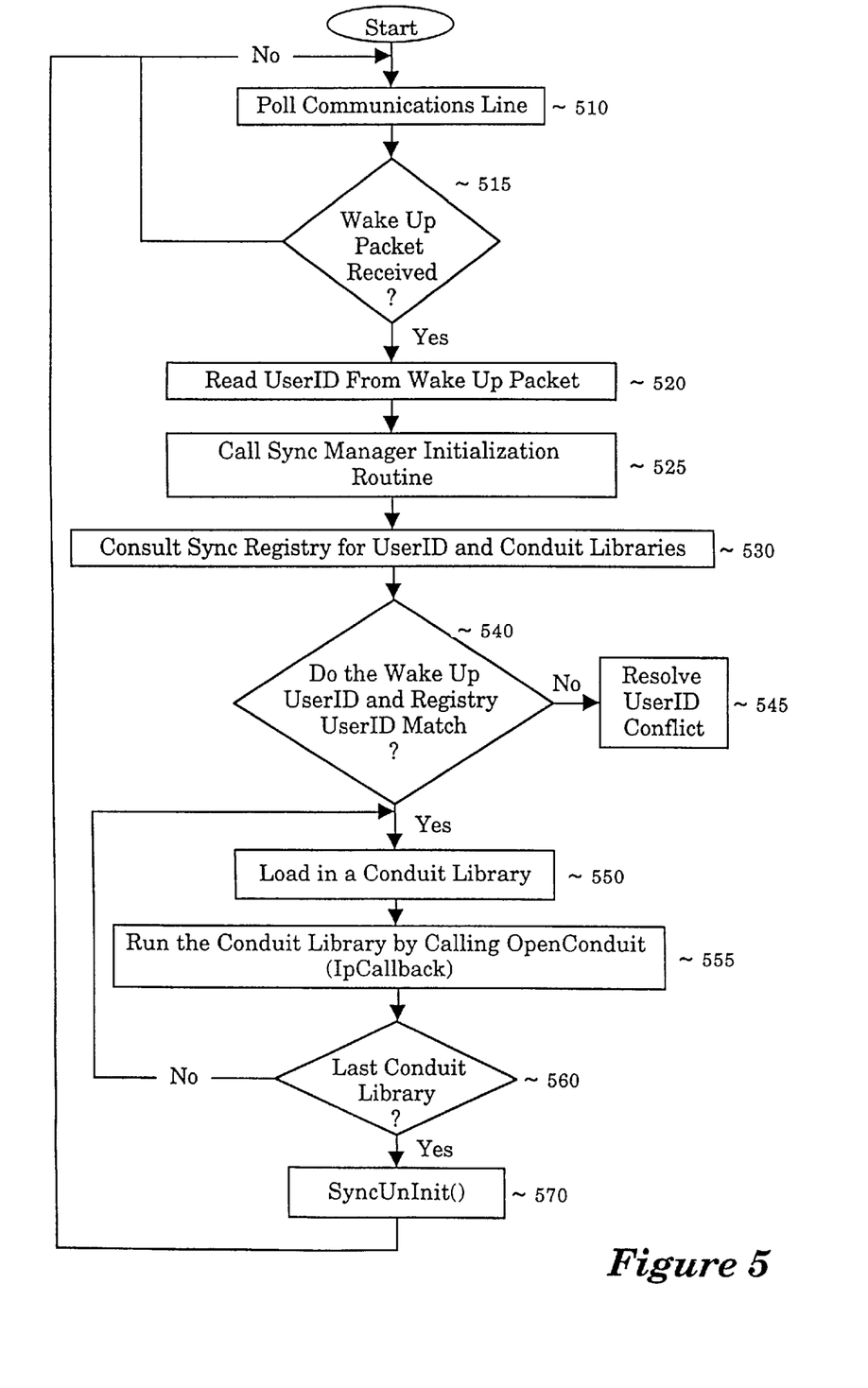
FIG. 5 is a flow diagram that illustrates the overall control flow of the synchronization system of the present invention.

To best illustrate how the synchronization system of the present invention operates, an example operation will be described. FIG. 5 illustrates a flow diagram of how the hotsync program 460, the sync manager dynamic link library 410, and conduit libraries operate to perform the synchronization. The hotsync program 460 is a small memory resident program that is optionally loaded in when the personal computer is booted and remains in memory. The hotsync program 460 periodically polls the communications link as stated in step 510 of FIG. 5. If at step 515 a wake-up packet has been received on the communications link, then the hotsync program 460 reads the user ID from the wake up packet at step 520 and proceeds to step 525 where it calls the initialization routine SyncInit( ) in the sync manager dynamic link library 410 to start the synchronization process. The Application Programming Interface (API) information near the end of this document contains a list of functions in the sync manager library 410.) Otherwise the hotsync program 460 continues polling the communication line back at step 510. The hotsync program 460 then consults a synchronization registry 430 for a user ID and a list of conduit libraries.

The hotsync program 460 compares the user ID retrieved from the sync registry 430 with the user ID received from the wake-up packet. If the two user IDs do not match, this means that the handheld computer does not match the expected handheld computer. In such situations the hotsync program 460 proceeds to step 545 to resolve the user ID conflict. The hotsync program 460 may resolve the user ID conflict by switching to an existing user ID file on the PC or creating a new user ID file on the PC.

The hotsync program 460 also retrieved a list of conduit libraries from the sync registry 430. Using the list of conduit libraries, the hotsync program 460 proceeds to load a first conduit library at step 550. At step 555 the hotsync program 460 calls a routine in the conduit library that allows the conduit library to begin its processing. When the hotsync program 460 starts the conduit processing, the hotsync program 460 provides a callback routine to the conduit library. The callback routine will be used by the conduit to report the progress of the conduit's activities such that the hotsync program 460 can display the progress of the synchronization on the PC's display screen. The conduit library performs its specific function as step 555. The conduit library calls the set of functions listed in the Application Programming Interface (API) information near the end of this document to perform its activities. A full description of one possible conduit library will be provided with reference to FIG. 6.

After the conduit library has completed execution at step 555, the hotsync program 460 proceeds to step 560 where it determines if this was the last conduit library in the list of conduit libraries retrieved from the sync registry 430. If it is not the last conduit library the hotsync program 460 returns to step 550 where it loads in and executes another conduit library. After the last conduit library has executed the hotsync program 460 calls a SyncUnInit( ) in the sync manager dynamic link library 410 to complete the synchronization process. (See the Application Programming Interface (API) information near the end of this document for more information about the SyncUnInit( ) function.) At this point the hotsync program 460 returns back to the loop where it polls the communications link for another wake-up packet indicating another synchronization request.

A Reconcile Database Conduit Example

The conduit libraries are each individually written to suit a particular database residing on the handheld computer system. There can be many different conduit libraries that perform many different types of functions. For example, there can be conduit libraries that install software onto the handheld computer system, conduit libraries that send and retrieve queued email, conduits that analyze and clean up the file system of the handheld computer system, and conduit libraries that backup the entire contents of the handheld computer system. Some of the conduit libraries will have associated databases and others will not.

Figure 6:
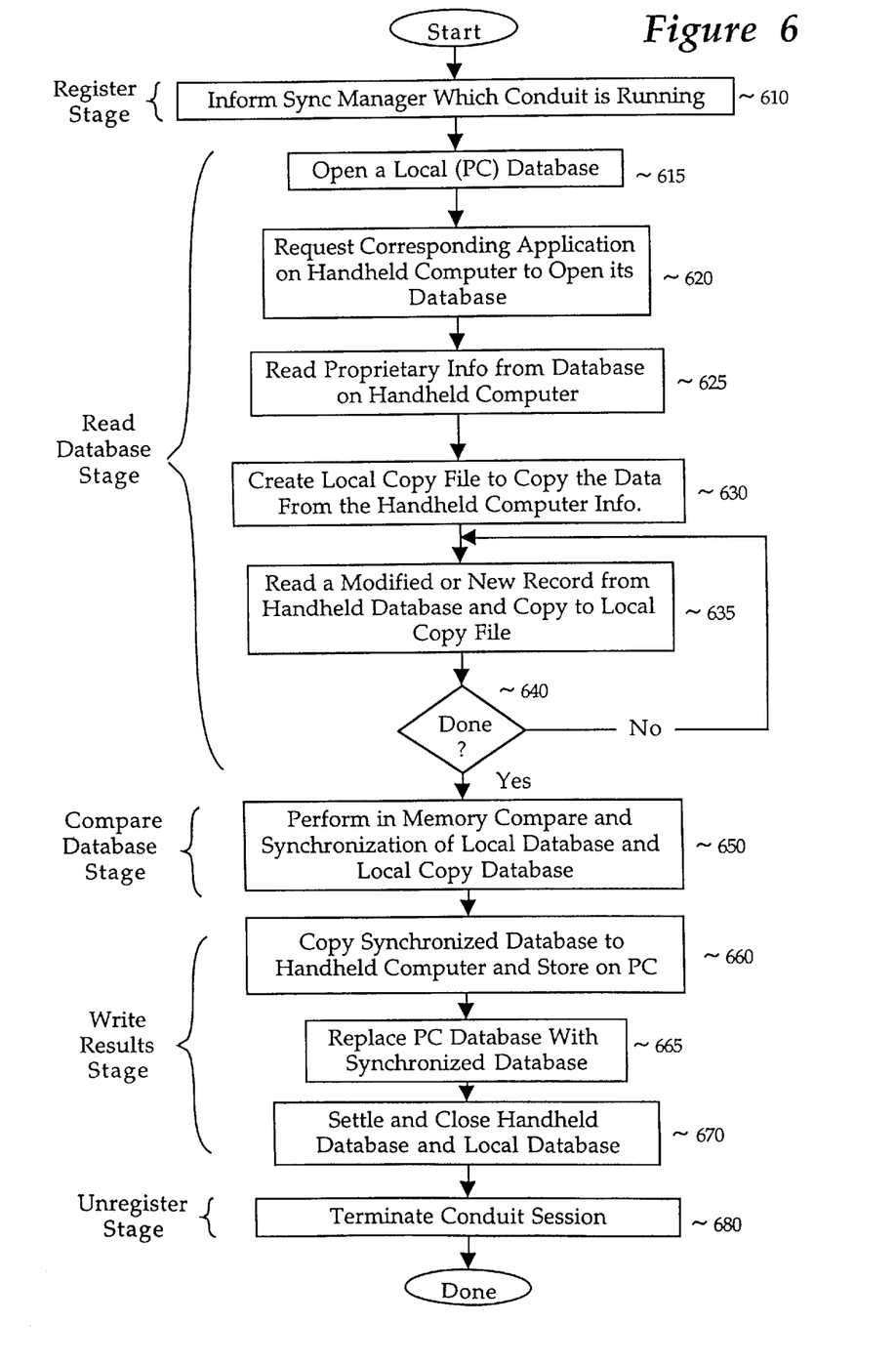
FIG. 6 is a flow diagram that illustrates the control flow of one possible Conduit library.
Figure 7:
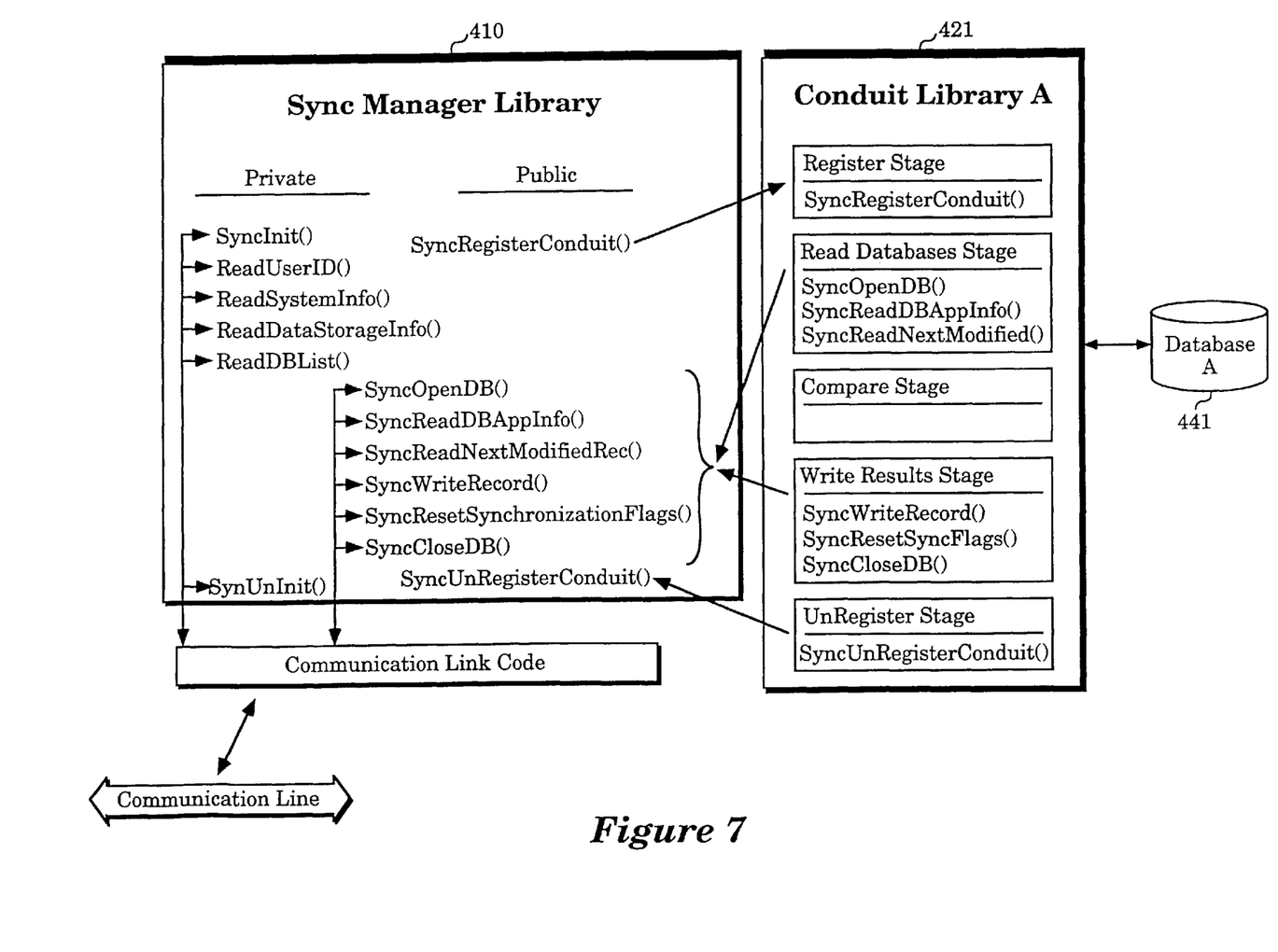
FIG. 7 is a conceptual diagram that illustrates the communication between the Sync Manager library and one possible Conduit library.

The most common type of conduit library is a conduit library that reconciles a pair of databases where one database is on the handheld computer system and one database is on the personal computer system. FIG. 6 illustrates an example control flow of a conduit library 421 that synchronizes two databases. FIG. 7 provides a conceptual diagram that illustrates some of the communication between the sync manager library 410 and the Conduit library 421.

Referring to FIG. 6, when any conduit begins executing (at step 610) the first stage is to inform the sync manager library 410 which conduit program is running. The conduit library 421 identifies itself to the sync manager library 410 by calling the SyncRegisterConduit( ) function in the sync manager library 410. (This step should not be confused with registering the conduit library 421 into the sync registry 430.)

The next stage is to read the databases. For this particular conduit that synchronizes two databases, the conduit library 421 opens up a local database located on the personal computer at step 615. At step 620, the conduit library then calls the function SyncOpenDB( ) in the sync manager library 410 to open up a corresponding database on the handheld computer 110. (See the Application Programming Interface (API) information near the end of this document for more information about the SyncOpenDB( ) function and other database functions.) Any proprietary information about the database on the handheld computer 110 is read at step 625. Next the conduit creates an empty file on the PC at step 630 to copy information from the database on the handheld computer system 110. The conduit library 421 may read the records from the handheld database one by one until an entire copy of the handheld database is created on the personal computer system 150. Alternatively, in a preferred embodiment the conduit library 421 will only copy records from the database that have been modified since the last synchronization.

The next stage is to compare and synchronize the handheld computer system database (or its modified records) and the personal computer system database. Having the local copy of the handheld database (or the modified records) on the personal computer and the local database on the personal computer, the conduit library 421 on the personal computer compares the two databases. Details of one possible comparison system is provided in the copending patent application with Ser. No. 08/544,927, filed on Oct. 18, 1995 now U.S. Pat. No. 5,727,202, entitled "Method and Apparatus For Synchronizing Information on Two Different Computer Systems." The outcome of the comparison is a reconciled database that incorporates all the information from both databases.

After comparing and reconciling the two databases, the next stage is to write the results of the comparison. The information from the reconciled database is copied over to the handheld computer 110 at step 660 using functions in the sync manager library 410 such as SyncWriteRecord( ). In preferred embodiment only new and modified records are copied to the handheld computer 110. Next, a function is called to settle the handheld database at step 670. The settle function clears all of the flags that indicate that a record has been modified since the last synchronization. Finally, the conduit library doses the handheld database using the SyncCloseDB( ) function in the sync manager library.

Then the conduit library ends the synchronization session by calling SyncUnRegister( ) function in the sync manager library 410. Control is then returned to the sync manager library 410 such that the sync manager library 410 can call another conduit library or end the synchronization process.

To fully describe how the synchronization system of the present invention operates, the full application programming interface of the SyncManager library is hereby provided. Specifically, a set of software functions that perform various synchronization tasks are defined. Also explained are some of the structures and parameters need to correctly call these public functions. The SyncManager library has 3 broad categories of services, a) Session services, b) File oriented services, c) Record oriented services. Structure definitions and memory management are discussed at the end of this section. As a point of reference, each API is documented with its parameters and a description. The first category of functions described here are 'Session Services'.

1. Session Oriented API
long SyncInit([in] CommandServer* pSrv)
Parameters:

CommandServer*—pointer to a CommandServer object which houses an established connection on the serial port.

Description:

Called as a result of the 'Hotsync' program detecting a 'wakeup' packet and wanting to begin the synchronization activities. After this call the sync manager program will loop and dynamically load all registered Conduit libraries so that each may carry out its individual synchronization procedures.

long SyncUnInit([in] CommandServer* pSrv)
Parameters:

CommandServer*—pointer to a CommandServer object which houses an established connection on the serial port.

Description:

Called to end the synchronization activities by disengaging the Conduit library.

long SyncReadUserID([in] LPSTR pBuffID)
Parameters:

LPSTR pBuffID—Buffer to hold incoming User ID

Description:

Instructs the handheld computer system to retrieve its local UserID and send it back to the calling PC.

long SyncReadUserID([in] CUserIDInfo &)
Parameters:

---

CUsewrIDInfo & - a reference to an empty CUserIDInfo structure
```
class CUserIDInfo {
public:
    char    m_pName[REMOTE_USERNAME];
    int     m_NameLength;
    char    m_pSubDir[128];
    long    m_LastSyncDate;  // Date/Time of this synchronization
    DWORD   m_LastSyncPC;    // ID of this (issuing) PC
    DWORD   m_Id;            // ID of the handheld computer itself
};
```

Description:
Instructs the handheld computer system to retrieve its local UserID information and send it back to the calling PC. The results will populate the structure members of the passed in parameter.
long SyncWriteUserID([out] CUserIDInfo & rUserInfo)
Parameters:

```
CUsewrIDInfo & - a reference to a populated CUserIDInfo structure
    class CUserIDInfo {
    public:
        char    m_pName[REMOTE_USERNAME];
        int     m_NameLength;
        char    m_pSubDir[128];
        long    m_LastSyncDate; // Date/Time of this sychronization
        DWORD   m_LastSyncPC; // ID of this (issuing) PC
        DWORD   m_Id; // ID of the handheld computer itself
    };
```

Description:
Instructs the handheld computer system to store the passed UserID information contained within the passed parameter to the handheld computer system's permanent storage.
long SyncRegisterConduit([in] int Id)
Parameters:
    int—Id
Description:
Called when a Conduit library first begins its synchronization activities. The Sync Manager will verify the incoming 'Id' with the list it has composed from consulting the Sync Registry.
long SyncUnRegisterConduit([in] int Id)
Parameters:
    int—Id
Description:
Called when a Conduit library has completed all of its synchronization activities. The Sync Manager will verify the incoming 'Id' with what it thinks is the 'current' session.
1. File Oriented API
long SyncOpenDB([in] LPSTR pName, [in] int cardNum, [out] BYTE & fHandle)
Parameters:
    LPSTR pName—Name of remote data file to open
    int cardNum—Memory card number which data file resides upon
    BYTE& fHandle—reference to a BYTE which receives the open file handle
Description:
Open a database (on the specified card #) for read/write access on the handheld computer system. Upon successful return, the third parameter will contain a numeric file handle which should be used in all subsequent file I/O operations.
long SyncCreateDB([in] CDbCreateDB & rDbStats)
Parameters:

```
rDbStats - reference to the following structure;
class CDbCreateDB {
public:
    BYTE    m_FileHandle;   // Filled in by HH
    DWORD   m_Creator;      // Supplied by caller, obtained from DbList
    eDbFlags m_Flags;       // Supplied by caller, Res/Rec/RAM
    BYTE    m_CardNo;       // Supplied by caller, target card #
    char    m_Name[32];     // Supplied by caller
    DWORD   m_Type;         // Reserved . . .
};
```

Description:
Create a single database file on the handheld computer system with the issued name.
long SyncCloseDB([in] BYTE fHandle)
Parameters:
    BYTE fHandle—open file handle to close
Description:
Close the currently open database on the handheld computer system.
long SyncDeleteDB([in] char* Name, [in] int cardNumber)
Parameters:
    char* Name—name of file to remove.
    int CardNumber—card number where the data base resides.
Description:
Instructs the communication server on the handheld computer system to delete the named file on the handheld device. The file must *not* be in use (i.e. closed) for this operation to succeed.
long SyncResetSynchronizationFlags([in] BYTE fHandle)
Parameters:
    BYTE fHandle—open valid file handle.
Description:
Instructs the communication server on the handheld computer system to scan all the records of the open database and reset their 'modified' flags to a neutral state. This may or may not be applicable for all Conduit libraries.
long SyncReadDBAppInfoBlock([in] BYTE fHandle, [in] CDbGenInfo & rDbInfo)
Parameters:

```
BYTE fHandle - open valid file handle.
CDbGenInfo & - reference to DbGeneral Info struct to receive information
    class CDbGenInfo {
    public:
        char    m_fileName[32];    // target database (file) Name
        long    m_totalBytes:      // total bytes allocated in pBytes
        byte    *m_pBytes;         // raw bytes of DbAppInfo, the knowledge
                                   // of the format is known by the conduit DLL
    };
```

Description:
Instructs the handheld computer system to locate and retrieve the information then store it in the passed structure. The calling client Conduit library must allocate enough memory in the general data area to hold the responding information. This function facilitates a trading of database specific information which may assist in the synchronization process. Enough memory must be pre-allocated on the incoming pointer by the calling Conduit library to hold the response data returned by the handheld computer system.
long SyncWriteDBAppInfoBlock([in] BYTE fHandle, [in] CDbGenInfo & rDbInfo)
Parameters:

```
BYTE fHandle - open valid file handle.
CDbGenInfo & - reference to DbGeneral Info struct to receive information
    class CDbGenInfo {
    public:
        char    m_fileName[32];    // target database (file) Name
        long    m_totalBytes;      // total bytes allocated in pBytes
        byte    *m_pBytes;         // raw bytes of DbAppInfo, the knowledge
                                   // of the format is known by the conduit DLL
    };
```

Description:
Instructs the handheld computer system to write the information stored in the passed structure to the handheld computer system's permanent storage associated with the open file handle.

long SyncReadDBSortInfoBlock([in] DBSortInfo *pDbSortInfo)

Parameters:

```
DBSortInfo* - Pointer to DBSortInfo Info struct
    typedef struct_DBSortInfo {
        int     m_conduitId;      // target conduit DLL Id
        char    m_fileName[32];   // target database (file) Name
        long    m_totalBytes;     // total bytes allocated in pBytes
        byte    *m_pBytes;        // raw bytes of DBSortInfo, the knowledge
    } DBSortInfo;
```

Description:

This function provides a facility to exchange database specific information with the handheld computer system. The calling client Conduit library must pre-allocate enough memory in the general data area to hold the responding information. May have no meaning to some Conduit libraries however, is in place to facilitate a trading of database (file) specific information which may assist in the synchronization process.

long SyncWriteDBSortInfoBlock([in] DBSortInfo *pDbSortInfo)

Parameters:

```
DBSortInfo* - Pointer to DBSortInfo Info struct
    typedef struct_DBSortInfo {
        int     m_conduitId;      // target conduit DLL Id
        char    m_fileName[32];   // target database (file) Name
        long    m_totalBytes;     // total bytes allocated in pBytes
        byte    *m_pBytes;        // raw bytes of DBSortInfo, the knowledge
    } DBSortInfo;
```

Description:

Instructs the handheld computer system to store the passed in database specific information associated with the indicated database file. The calling client Conduit DLL must pre-allocate enough memory in the general data area to hold the information. May have no meaning to some Conduit libraries, however, is in place to facilitate a trading of database (file) specific information which may assist in the synchronization process.

1. Record Oriented API

The following APIs will need to pass the representation of a record, which lives in a database (file), between the PC and the handheld computer system. Since the role of the Sync Manager library is to act more or less as a shipping channel for byte traffic to the handheld computer system, the need exists for a generic definition of a structure which should handle any record format. This generic structure will them become a parameter in these 'Record Oriented' APIs. For reading records 3 different APIs are provided allowing for:

A) sequentially locate the next altered record via SyncReadNextModifiedRec( )

B) an exact record lookup via SyncReadRecordById( )

C) top to bottom iteration via SyncReadRecordByIndex( )

The same structure 'CRawRecordInfo' is used in all 3 APIs, however different structure members are utilized for each function call. Any member documented with the following note syntax 'Filled in by HH' indicates the handheld computer system will supply that data.

long SyncReadNextModifiedRec([in] CRawRecordInfo & rRec)

Parameters:

```
rRec & - reference to incoming Raw Record Info structure
    class CRawRecordInfo{
    public:
        BYTE    m_FileHandle;    // Valid open file handle
        DWORD   m_RecId;         // Filled in by HH
        WORD    m_RecIndex;      // Ignore
        BYTE    m_Attribs;       // Filled in by HH
        short   m_CatId;         // Filled in by HH
        int     m_ConduitId;     // Ignore
        DWORD   m_RecSize;       // Filled in by HH
        WORD    m_TotalBytes;    // Supplied by caller
        BYTE *  m_pBytes;        // Pre-Allocated by caller
    };
```

Description:

Instructs the handheld computer system to traverse its currently open database (file) and return the next record it encounters which has been modified since the last sync negotiation. It is expected that the caller will have allocated enough memory onto the 'm_pBytes' pointer to contain the response from the handheld computer system.

The structure member 'm_RecSize' is provided so the handheld computer system may indicate the exact number of bytes present in the returned record body.

long SyncReadRecordById([in] CRawRecordInfo & rRec)

Parameters:

```
rRec & - reference to incoming Raw Record Info structure
    class CRawRecordInfo{
    public:
        BYTE    m_FileHandle;    // Valid open file handle
        DWORD   m_RecId;         // Filled in by HH
        WORD    m_RecIndex;      // Ignore
        BYTE    m_Attribs;       // Filled in by HH
        short   m_CatId;         // Filled in by HH
        int     m_ConduitId;     // Ignore
        DWORD   m_RecSize;       // Filled in by HH
        WORD    m_TotalBytes;    // Supplied by caller
        BYTE *  m_pBytes;        // Pre-Allocated by caller
    };
```

Description:

Can be thought of as a Seek/Find procedure. The Sync Manager Library merely delivers this structure to the handheld computer system and it remains the responsibility of the handheld computer system to interpret and carry out the intentions of the sending conduit. Generally, the handheld computer system will search its currently open database looking for a match on the unique record present in the structure member 'm_RecId'. Upon successful execution of this routine the structure member 'm_pBytes' will contain the raw record body from the handheld computer system.

long SyncReadRecordByIndex([in] CRawRecordInfo & rRec)

Parameters:

```
rRec & - reference to incoming Raw Record Info structure
    class CRawRecordInfo{
    public:
        BYTE    m_FileHandle;    // Valid open file handle
        DWORD   m_RecId;         // Filled in by HH
        WORD    m_RecIndex;      // Ignore
        BYTE    m_Attribs;       // Filled in by HH
```

```
    short     m_CatId;         // Filled in by HH
    int       m_ConduitId;     // Ignore
    DWORD     m_RecSize;       // Filled in by HH
    WORD      m_TotalBytes;    // Supplied by caller
    BYTE *    m_pBytes;        // Pre-Allocated by caller
};
```

Description:

By iteratively supplying sequential values to the structure member 'm_RecIndex' a Conduit may traverse a handheld computer system data base from top-to-bottom. This structure member 'm_RecIndex' can be thought of as an array offset, in essence accessing a specific record in an open data base by its relative offset from the beginning of the file. Generally, the handheld computer system will walk the currently open database from the top and return the record body located at the 'm_RecIndex' position. Upon successful execution of this routine the structure member 'm_pBytes' will contain the raw record body from the handheld computer system.

long SyncWriteRec([in] CRawRecordInfo & rRec)
Parameters:

```
rRec & - reference to incoming Raw Record Info structure
    class CRawRecord Info{
    public:
      BYTE     m_FileHandle;     // Valid open file handle
      DWORD    m_RecId;          // Supplied by caller, can be 0 on new records
      WORD     m_RecIndex;       // Ignore
      BYTE     m_Attribs;        // Supplied by caller
      short    m_CatId;          // Supplied by caller
      int      m_ConduitId;      // Ignore
      DWORD    m_RecSize;        // Supplied by caller
      WORD     m_TotalBytes;     // Supplied by caller
      BYTE *   m_pBytes;         // Pre-Allocated by caller, contains record body
    };
```

Description:

Instructs the handheld computer system to write the passed record into the open database file. The caller must supply either a valid record ID in the member 'm_RecId', or place zero in this member which indicates to the handheld computer system to *append* this record as a new record to the open file. The record body is placed in the memory on the pointer 'm_pBytes' and should be formatted in a manner that matches the record layouts in the open data base on the handheld computer system.

long SyncDeleteRecord([in] CRawRecordInfo & rRec)
Parameters:

```
rRec & - reference to incoming Raw Record Info structure
    class CRawRecordInfo{
    public:
      BYTE     m_FileHandle;     // Valid open file handle
      DWORD    m_RecId;  // Supplied by caller, target rec to delete
      WORD     m_RecIndex/       // Ignore
      BYTE     m_Attribs;        // Ignore
      short    m_CatId;          // Ignore
      int      m_ConduitId;      // Ignore
      DWORD    m_RecSize         // Ignore
      WORD     m_TotalBytes;     // Ignore
      BYTE *   m_pBytes;         // Ignore
    };
```

Description:

Instructs the handheld computer system to delete the record using the value in the structure member 'm_RecId' as the key, inside the open database file.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of sharing information on a first computer system and a second computer system, said method comprising:

connecting said first computer system to said second computer system with a data communications link;

providing a library of functions in said second computer system for accessing information on said first computer system;

creating a conduit program database, said conduit program database for storing a list of conduit programs that may be executed, registering a first conduit program by placing an identifier for said first conduit program in said conduit program database, said first conduit program comprising a computer program on said second computer system for performing a specific data transfer task;

successively executing a set of conduit programs identified within said conduit program database from a manager program, each of said conduit programs accessing said library of functions for communicating with said first computer system.

2. The method of sharing information as claimed in claim 1 further comprising:

registering a second conduit program by placing an identifier for said second conduit program in said conduit program database, said second conduit program comprising a computer program on said second computer system for performing a specific data transfer task.

3. The method of sharing information as claimed in claim 1 further comprising:

executing a memory resident program in said second computer system; and loading in and executing said manager program when said memory resident program detects that a synchronization has been requested by a user.

4. The method of sharing information as claimed in claim 3 further comprising:

monitoring said communications link from said memory resident program; and detecting a synchronization request when a predetermined packet is received on said communications link.

5. The method of sharing information as claimed in claim 3 further comprising:

providing a communication link library, said communication link library comprising a set of functions in said second computer system for communicating across said data communications link, wherein said library of functions in said second computer system for accessing information on said first computer system uses said communication link library for communicating across said data communications link.

6. The method of sharing information as claimed in claim 1 wherein said first conduit program comprises an installation program that loads a new software program onto said first computer system.

7. The method of sharing information as claimed in claim 1 wherein said first conduit program sends and retrieves queued email.

8. The method of sharing information as claimed in claim 1 wherein said first conduit program analyzes and cleans up a file system on said first computer system.

9. The method of sharing information as claimed in claim 1 wherein said first conduit program performs the following steps retrieving a set of modified records from a first database on said first computer;

comparing said set of modified records retrieved from said first database on said first computer system with a second database on said second computer system to create a synchronized database; and writing records from said synchronized database to said first database on said first computer system.

10. The method of sharing information as claimed in claim 1 wherein said first conduit program performs the following steps:

retrieving all records from a first database on said first computer;

comparing said records retrieved from said first database on said first computer system with a second database on said second computer system to create a synchronized database; and writing records from said synchronized database to said first database on said first computer system.

11. An apparatus for transferring information on a first computer system and a second computer system, said apparatus comprising:

a data communications link, said data communications link connecting said first computer system to said second computer system;

a conduit program registry on said second computer system, said conduit program registry storing a list of identifiers of conduit programs that perform specific data transfer tasks;

at least one conduit program on said second computer system, said conduit program registered in said conduit program registry, said conduit program for transferring information between said first computer system and said second computer system; and a manager program on said second computer system, said manager program successively invoking said conduit programs.

12. The apparatus as claimed in claim 11 wherein said conduit program comprises an installation program that loads a new software program onto said first computer system.

13. The apparatus as claimed in claim 11 wherein said conduit program sends and retrieves queued email.

14. The apparatus as claimed in claim 11 wherein said conduit program analyzes and cleans up a file system on said first computer system.

15. The apparatus for transferring information as claimed in claim 11 further comprising:

a memory resident program in said second computer system, said memory resident program loading in said manager program when said memory resident program determines that a synchronization has been requested by a user.

16. The apparatus for transferring information as claimed in claim 11 further comprising:

a sync manager link library on said second computer system, said sync manager link library comprising a set of functions for accessing information on said first computer system from said second computer system.

17. The apparatus for transferring information as claimed in claim 16 further comprising:

a communications link library, said communications link library comprising a set of communication functions for communicating via said data communications link, said sync manager link library accessing said set of communication functions for communicating via said data communications link.

18. The apparatus for transferring information as claimed in claim 11 further comprising:

a first database on said first computer; and a second database on said second computer, said conduit program reconciling said first database with said second database.

19. A cooperative computer system apparatus for transferring information, said apparatus comprising:

a first computer system;

a second computer system;

a data communications link, said data communications link coupling said first computer system to said second computer system;

at least one conduit program on said second computer system, said conduit program for transferring information between said first computer system and said second computer system;

a synchronization registry on said second computer system, said synchronization registry containing a list of said conduit programs; and a manager program on said second computer system, said manager program successively invoking said list of said conduit programs.

20. The apparatus as claimed in claim 19 further comprising:

a memory resident program in said second computer system, said memory resident program loading in and executing said manager program when said memory resident program determines that a synchronization has been requested by a user.

21. The apparatus as claimed in claim 19 wherein said conduit program comprises an installation program that loads a new software program onto said first computer system.

22. The apparatus as claimed in claim 19 wherein said conduit program sends and retrieves queued email.

23. The apparatus as claimed in claim 19 wherein said conduit program analyzes and cleans up a file system on said first computer system.

24. The apparatus for transferring information as claimed in claim 19 further comprising:

a sync manager link library on said second computer system, said sync manager link library comprising a set of functions for accessing information on said first computer system from said second computer system.

25. The apparatus for transferring information as claimed in claim 24 further comprising:

a communications link library, said communications link library comprising a set of communication functions for communicating via said data communications link, said sync manager link library accessing said set of communication functions for communicating via said data communications link.

26. The apparatus for transferring information as claimed in claim 19 further comprising:

a first database on said first computer; and a second database on said second computer, said conduit program reconciling said first database with said second database.

27. The cooperative computer system as claimed in claim 19 wherein said manager program comprises a set of functions for communicating with said first computer system.

* * * * *